(12) United States Patent
Mueller et al.

(10) Patent No.: US 7,687,568 B2
(45) Date of Patent: Mar. 30, 2010

(54) POLYESTER COLORANT CONCENTRATE

(75) Inventors: Wolfgang Mueller, Premnitz/OT Doeberitz (DE); Harald Eckhardt, Niederwerth (DE); Hans-Peter Koenig, Montabaur (DE); Nathalie Fischbach, Lahnstein (DE); Franz Thurnherr, Basel (CH)

(73) Assignee: Clariant Masterbatches (Deutschland) GmbH, Lahnstein (DE)

( * ) Notice: Subject to any disclaimer, the term of this patent is extended or adjusted under 35 U.S.C. 154(b) by 0 days.

(21) Appl. No.: 11/663,521

(22) PCT Filed: Sep. 17, 2005

(86) PCT No.: PCT/EP2005/010054

§ 371 (c)(1),
(2), (4) Date: Mar. 21, 2007

(87) PCT Pub. No.: WO2006/032423

PCT Pub. Date: Mar. 30, 2006

(65) Prior Publication Data

US 2008/0085959 A1  Apr. 10, 2008

(30) Foreign Application Priority Data

Sep. 21, 2004 (DE) .................. 10 2004 045 639

(51) Int. Cl.
*C08F 283/02* (2006.01)
(52) U.S. Cl. .............. 524/513; 524/88; 524/90; 523/351
(58) Field of Classification Search ........... 524/513, 524/88, 90; 523/351
See application file for complete search history.

(56) References Cited

U.S. PATENT DOCUMENTS

| | | | |
|---|---|---|---|
| 3,436,301 A | 4/1969 | McHale | |
| 3,926,920 A | 12/1975 | Georgoudis et al. | |
| 4,279,802 A | 7/1981 | Laely et al. | |
| 4,782,111 A | 11/1988 | Klein et al. | |
| 5,484,837 A | 1/1996 | Kung et al. | |
| 5,604,279 A | 2/1997 | Bernhardt et al. | |
| 5,965,261 A | 10/1999 | Webster | |
| 6,596,067 B2 | 7/2003 | Menzel et al. | |
| 7,066,993 B2 | 6/2006 | Wuzik et al. | |

FOREIGN PATENT DOCUMENTS

| | | |
|---|---|---|
| DE | 1183195 | 12/1964 |
| DE | 1594216 | 8/1969 |
| DE | 1965379 | 7/1970 |
| EP | 0008373 | 3/1980 |
| EP | 0114386 | 8/1984 |
| GB | 889617 | 2/1962 |
| GB | 1044378 | 9/1966 |
| GB | 1249720 | 10/1971 |
| WO | WO 91/13931 | 9/1991 |

OTHER PUBLICATIONS

PCT Search Report for PCT/EP2005/010054, mailed Dec. 21, 2005.
Kim D-J et al., "Effects of Dispersing Agents on Dispersity and Mechanical Properties of Carbon Black/PET," Polymer Engineering and Science, Wiley, Hoboken, NJ, US vol. 39 No. 3, ppp. 500-507; Mar. 1999.
PCT English Translation of PCT International Preliminary Report on Patentability for PCT/EP 2005/010054, mailed Jul. 12, 2007.

*Primary Examiner*—Peter D Mulcahy
(74) *Attorney, Agent, or Firm*—Anthony A. Bisulca

(57) ABSTRACT

Polyester colorant concentrates containing; 1) a polyester supporting material; b) a colorant selected from the group of dyes and/or pigments; c) 0.1 to 2 parts by weight per part by weight of the colorant of copolyester comprising the reaction product from (A) of at least one aliphatic primary dihydric alcohol with 2 to 6 C atoms, and; (b) dicarboxylic acids selected from the group consisting of phthalic acid, terephthalic acid, isophthalic acid and/or sebacic acid. The copolyester is characterized by having i) a melting range between 120 and 160° C., ii) a melting viscosity SV ranging from 12 to 126 Pa*s, measured at 190° C. and 2.16 kg in accordance with ISO 1133, and iii) a melting viscosity factor SF ranging from $-2.3$ to $-0.3$ Pa*s/deg determined at a temperature increase ranging from 160° C. to 240° C. with a shear rate of 109 $s^{-1}$. The inventive polyester colorant concentrates are particularly suited for spin dyeing polyester fibers and filaments.

10 Claims, No Drawings

POLYESTER COLORANT CONCENTRATE

The invention relates to new polyester colorant concentrates obtainable by introducing a copolyester from the class of polyester hotmelt adhesives having a defined melt viscosity behavior for controlling the melt viscosity of the colorant/polyester product for improved incorporation into a spinning polymer.

There are numerous processes known for preparing polyester colorant concentrates with a variety of carrier materials and both with and without dispersing assistant.

For instance, EP-A-0 008 373 describes the production of a pigment preparation for the mass coloring of linear polyesters, whereby from 20 to 80 parts of pigment and 80 to 20 parts of a polyester that melts between 60 and 160° C. a preconcentrate is prepared, by means of solvent salt kneading, that is melted with a spinnable linear polyester and processed to pellets.

WO 91/13931 describes a process for producing highly concentrated pigment concentrates (masters) with the highest achievable color strength, where a mixture of (A) one or more pigments and/or fillers, (B) one or more anionic, nonanionic, cationic, and electrically neutral wetting agents and/or (C) one or more polymer carriers, and, where appropriate, further additives is charged to a suitable mixer, in which this mixture is subjected to high shearing forces for a defined period of time, until the composition melts as a result of the frictional heat generated.

EP-A-0 114 386 describes a process for producing polyester colorant products where the colorant carrier is composed of a linear polyester having a softening point of above 60° C. and polybutylene terephthalate having a specific viscosity of 0.5 to 1.5, measured at a polymer concentration of 1 g/100 ml in dichloroacetic acid at 25° C., and the colorant product between 210° C. and 150° C., preferably between 200° C. and 160° C., has a recrystallization exotherm of 8 to 55 joules/g, and the colorant carrier comprises a copolyester of terephthalic acid/isophthalic acid and ethylene glycol.

The use of copolyesters based on alkanediols and organic dicarboxylic acids as hotmelt adhesives is known through numerous publications.

For instance, U.S. Pat. No. 3,926,920 discloses the preparation of a heat-stable hotmelt adhesive with a low viscosity and a melting point of not more than 150° C., which is formed by reaction from a mixture of at least one aliphatic glycol having 2 to 6 carbon atoms and from a mixture of two or more dicarboxylic acids or their functional dicarboxylic acid derivatives in defined concentration ratios.

DE-A 1 594 216 describes the preparation of copolyester compositions as hotmelt adhesive for use as footwear adhesives, having a melting point of 70 to 160° C. and a relative viscosity of 1.3 to 1.6, tested in a solution of 0.3 g of the copolyester in 50 ml of a solvent mixture of 41.2% 2,4,6-trichlorophenol and 58.8% phenol at 25° C., the copolyester being formed by esterification of a mixture of dicarboxylic acids and an aliphatic diol. The dicarboxylic acids are a mixture of terephthalic acid, isophthalic acid, and an aliphatic dicarboxylic acid having 6 to 36 carbon atoms, and the major molar fraction of the aliphatic diol is a butanediol, at at least 80 mol %.

In connection with the production of dye and/or pigment concentrates with polyester carrier systems, the maximum concentrations of the colorants are determined in particular by their solubility behavior in the carrier system, their melting point, and their influence on the viscosity behavior in the carrier system. The concentration of organic or inorganic pigments for the production of masters of acceptable quality is primarily dependent on the dispersing behavior in the carrier system, the particle size, the wettability by the carrier system, and, to a substantial degree, on the rheological (flow) behavior of the masterbatch system under the production and processing conditions.

In the case of carbon black/polyester products, therefore, the practical limit on the concentration of carbon black in the master is approximately 30%, owing to the surface area/volume ratio of the carbon black particles, the low wettability, and the associated high melt viscosity or structural viscosity (dynamic viscosity) of the masters.

The production of masterbatches with pigments and/or dyes on the basis of polyester carrier systems is often accompanied, as a result of shearing in the course of extrusion or kneading, even after prior intensive (hot or warm) mixing, slow mixing or addition of individual components, by unwanted degradation of the polyester carrier. These polymer-chain fragmentations lead to a reduction in the specific viscosity (intrinsic viscosity) of the carrier system and, consequently, also to a significant reduction in the specific viscosity (intrinsic viscosity) of the colored spinning polymer, with the consequences of reduced spinnability and a lower quality. One remedy, particularly with regard to the reduction in specific viscosity, can be achieved in some cases through the use of polyester carrier materials having higher specific viscosities. However, the targeted adaptation of the melt viscosity of the master to the melt viscosity of the polyester spinning polymer is not possible with the known procedures.

An aim of the invention is therefore to provide a method of adapting the melt viscosity (dynamic viscosity) and the specific viscosity (intrinsic viscosity) of colorant-comprising polyester masters to the melt rheology of undoped, customary spinning polymers for the production of polyester fiber and polyester filament.

In accordance with the invention the object is achieved by adding a below-defined copolyester from the class of polyester hotmelt adhesives to the usual components used in a polyester colorant concentrate (master), such as carbon black and/or pigments and/or dyes, here referred to as colorants, and polyester carrier, and also, if desired, dispersing assistant(s), before or during the melting of the individual components or of the mixture by extrusion or kneading.

The invention provides a polyester colorant concentrate comprising
(a) a polyester carrier material,
(b) a colorant from the group of dyes and/or pigments,
(c) 0.1 to 2 parts, preferably 0.5 to 1.5 parts, by weight per part by weight of colorant of a copolyester comprising the reaction product of
  (A) at least one aliphatic primary dihydric alcohol having 2 to 6 carbon atoms and
  (B) dicarboxylic acids from the group phthalic acid, terephthalic acid, isophthalic acid and/or sebacic acid;
  said copolyester having
  (i) a melting range between 120 and 160° C., preferably between 130 and 150° C.;
  (ii) a melt viscosity MV of 12 to 126 Pa*s, measured at 190° C. and 2.16 kg in accordance with ISO 1133; and
  (iii) a melt viscosity factor MF of −2.3 to −0.3 Pa·s/deg, determined with a temperature increase in the range from 160° C. to 240° C. at a shear rate of 10 $s^{-1}$.

The melt viscosity factor MF denotes the decrease in melt viscosity MV in Pa*s per degree of temperature increase in the range from 160° C. (433 K) to 240° C. (513 K) at a shear rate of 10 $s^{-1}$ (plate/plate viscometer, e.g., ®Rheometer SR 200 from Rheometrics). It can be described by the following equation:

$$MF[\text{Pa}^*s/deg] =$$

$$\frac{\text{Shear viscosity } MV[\text{Pa}^*s]}{\text{Temperature change } \Delta T[deg]} = \frac{\exp(a^*T_1 + 14.1) - \exp(a^*T_2 + 14.1)}{(T_1 - T_2)}$$

where $a=-0.025$ to $-0.020$, preferably $a=-0.023$, and $T_{1/2}$ in kelvins in the range from 433 K to 513 K.

The polyester carrier material (a) can be a colorant carrier which is customary for colorant masterbatches. Suitable polyesters are linear polyesters of aromatic and/or aliphatic dicarboxylic acids with aliphatic diols. Dicarboxylic acids are, for example, phthalic, terephthalic, isophthalic, azelaic, sebacic or adipic acid. Suitable glycols include the following: ethylene glycol, 1,3-propanediol, 1,4-butanediol, 1,4-di(hydroxymethyl)cyclohexane and neopentyl glycol. Preferred polyester carrier materials are composed essentially of polyethylene terephthalate and/or polybutylene terephthalate and/or polytrimethylene terephthalate and/or copolyesters based on a mixture of two or more of said dicarboxylic acids and an aliphatic alkanediol.

The polyesters used as carrier material may have a melting range of about 70 to 300° C.

Polyester carrier materials suitable in accordance with the invention are specified in, for example, DE-A-19 65 379 and DE-A-11 83 195.

Suitable colorants (b) include organic and inorganic pigments and also polymer-soluble, partly polymer-soluble or polymer-insoluble dyes. Suitable organic pigments include monoazo, disazo, laked azo, β-naphthol, naphthol AS, benzimidazolone, disazo condensation, azo metal complex pigments and polycyclic pigments such as phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrol pigments or carbon blacks.

As an exemplary selection of particularly preferred organic pigments, mention may be made of carbon black pigments, such as gas blacks or furnace blacks, for example; monoazo and disazopigments; and phthalocyanine, anthraquinone, and quinacridone pigments.

Examples of suitable inorganic pigments are titanium dioxides, zinc sulfides, iron oxides, chromium oxides, ultramarine, nickel or chromium antimony titanium oxides, cobalt oxides, mixed oxides of cobalt and aluminum, bismuth vanadates, and extender pigments.

Suitable organic dyes include acid dyes, direct dyes, sulfur dyes and their leuko form, metal complex dyes or reactive dyes.

The amount of colorant in the polyester colorant concentrate of the invention can be between 5% and 60%, preferably between 15% and 40%, by weight, based on the total weight of the polyester colorant concentrate.

As copolyester (c) it is possible to use a product known in technical circles as a polyester hotmelt adhesive, provided it has the specified melt properties (i) and viscosities (ii) and (iii).

Suitable copolyesters are, for example, reaction products of (A) at least one aliphatic primary glycol having 2 to 6 carbon atoms, and (B) a mixture (100 mol %) of 25 to 65, preferably 30 to 55, mol % terephthalic acid, 25 to 65, preferably 30 to 55, mol % isophthalic acid, and 5 to 20, preferably 5 to 15, mol % phthalic acid.

Further suitable copolyesters are, for example, reaction products of (A) at least one aliphatic primary glycol having 2 to 6 carbon atoms, and (B) a mixture (100 mol %) of 40 to 55 mol % terephthalic acid, 25 to 50 mol % isophthalic acid, and 7 to 23 mol % sebacic acid.

The glycol component can be a single glycol or a combination of different glycols, such as 1,2-ethanediol, 1,3-propanediol, 1,4-butanediol, 1,6-hexanediol and neopentyl glycol. Irrespective of whether a single glycol or a mixture of two or more glycols is used the glycol component must be chosen such that the required viscosities and the melting range of the copolyester are achieved. Particular preference is given to 1,4-butanediol or 1,6-hexanediol and also to a combination thereof with ethylene glycol or neopentyl glycol.

The preparation of copolyesters of this kind is known and is described for example in U.S. Pat. No. 3,926,920.

The polyester colorant concentrates of the invention may further comprise customary dispersing assistants, particularly from the group of polyester waxes and/or copolyesters, which do not conform to the specific inventive characteristics of the hotmelt adhesives, and are present preferably in amounts of 0.5% to 30% by weight, based on the total weight of the colorant concentrate.

As a result of the inventive addition of the copolyester it is possible, surprisingly, to control the melt viscosity of the polyester colorant concentrate and to adapt it to the melt viscosity of an unpigmented crude polyester spinning material. Surprisingly it has been found that, by this means, even highly pigmented polyester masters can be produced, with the same or similar rheological properties as those of unpigmented polyester spinning polymers, which can be incorporated significantly more effectively and more uniformly into the spinning polymer.

The present invention also provides a process for producing said polyester colorant concentrates by mixing components (a), (b), and (c), melting, homogenizing, dispersing, cooling, and pelletizing. The individual process steps for producing colorant concentrates (masterbatches) are common knowledge to the skilled worker.

The polyester colorant concentrates of the invention can be used to particularly good effect in the spin coloring of polyester fibers or polyester filaments, particularly for incorporation into the polyester spinning melt by means of a sidestream extruder, or via prior mixing of the pellets of polyester colorant concentrate (masterbatch) and polyester spinning pellets and the subsequent joint melting thereof in the spinning extruder.

COMPARATIVE EXAMPLE

To produce a polyester/carbon black masterbatch for the coloring of staple PET fiber immediately prior to spinning, a conventional procedure was used to melt a powder mixture consisting of 30% by weight of lamp black, 8% by weight of a dispersing assistant, and 62% by weight of PET carrier material in an extruder, followed by dispersion and homogenization of the melt, its extrusion through a die plate, the taking-off of the extrudate to form monofilament strands, and, after cooling, the chopping of the strands to pellets in a pelletizer.

The polyester/carbon black concentrate thus prepared had a specific solution viscosity, based on PET carrier material present, of 547, measured at a polymer concentration of 1 g/100 ml in dichloroacetic acid at 25° C. (298 K). The melt viscosity as determined using a plate/plate viscometer (Rheometer SR 200 from Rheometrics) was 3275 [Pa*s] (at 280° C.=553 K and a shear rate of 10 s$^{-1}$).

Introducing this polyester/carbon black concentrate by means of sidestream technology, i.e., melting by means of the melting extruder and injection in a heated pipeline into the melt flow of the spinning polymer upstream of the spinnerettes, was impossible owing to the very high melt viscosity of 3275 [Pa*s]. Owing to the very high pressure drop, caused in turn by the high melt viscosity of the masterbatch, blockages occurred in the pipeline and the sidestream line failed, with the consequence of interruptions to the spinning operation as a whole.

Example 1

A polyester/carbon black masterbatch was produced, by using a powder mixture of 30% by weight of lamp black, 42% by weight of the PET carrier material, 20% by weight of a copolyester from the class of hotmelt adhesives, and 8% by weight of a dispersing assistant. The proportion of the added copolyester was, inventively, 67% by weight of copolyester, based on the amount of lamp black employed. The copolyester used was a condensation product of 1,4-butanediol as glycol component, and 55 mol % terephthalic acid, 35 mol % isophthalic acid and 10 mol % sebacic acid as molar proportions of the dicarboxylic acid component, obtainable in accordance with DE-A-15 94 216, example 4.

The inventive mixture was subsequently extruded and pelletized as described in the comparative example. The polyester/carbon black masterbatch pellets of the invention had a specific solution viscosity of 563, measured at a polymer carrier concentration of 1 g/100 ml in dichloroacetic acid at 25° C. (298 K), and a melt viscosity of 181 [Pa*s] (determined by means of plate/plate viscometer SR 200 from Rheometrics at 280° C.=553 K and a shear rate of 10 s$^{-1}$) and, in contrast to the comparative example, was readily incorporable, with no increase in melt pressure in the concentrate line of the sidestream line, into the melt flow of the spinning polymer upstream of the spinnerets, for the purpose of coloring staple PET fiber.

Example 2

A mixture of 28% by weight of lamp black, 60% by weight of polybutylene terephthalate (PBT), and 12% by weight of a copolyester from the class of commercially customary hotmelt adhesives (43% by weight of copolyester, based on the amount of carbon black pigment employed) having a melting point of 141 ° C. (414 K), a melt viscosity MV of 30 Pa*s (determined at 190° C. (463 K) under a weight load of 2.16 kg (tested in accordance with ISO 1133) and a melt viscosity factor MF=−0.66 [Pa*s/deg] in accordance with MV [Pa*s]= exp(−0.023*T+14.1), determined by means of a plate/plate viscometer SR 200 from Rheometrics in the temperature range from 160° C. (433 K) to 240° C. (513 K) and at a shear rate of 10 s$^{-1}$, was melted in an extruder as a powder mixture without addition of further additives or dispersing assistants, and the melt was dispersed and homogenized, and subsequently the extruded monofilament strands, after cooling in a water bath, were chopped into pellets. The PBT/carbon black concentrate pellets produced in accordance with the invention had a specific solution viscosity of 873, determined at a PBT/copolyester concentration of 1 g/100 ml in dichloroacetic acid at 25° C. (298 K), and had a melt viscosity of 276 [Pa*s], determined by means of a plate/plate viscometer SR 200 from Rheometrics at 280° C.=553 K and a shear rate of 10 s$^{-1}$.

The PBT/carbon black masterbatch produced in accordance with the invention was readily incorporated, with no increase in pressure in the concentrate line of the sidestream line, into the PET spinning material.

The levelness of filament dyeing was likewise improved, with all physical textile parameters of the PET filament thus colored being ensured without reduction.

Example 3

A powder mixture consisting of 30% by weight of lamp black, 53% by weight of a mixture of polyethylene terephthalate and polybutylene terephthalate (mixing ratio 1:1), and, inventively, 17% by weight of the copolyester from example 2 (57% by weight of copolyester, based on the amount of carbon black pigment employed) was, in accordance with the procedure described above, melted in an extruder, dispersed, and homogenized, then extruded into monofilament strands and, after cooling, reduced to pellets. The polyester/carbon black masterbatch thus produced had a specific solution viscosity of 790, determined at a total polymer concentration of 1 g/100 ml in dichloroacetic acid at 25° C. (298 K), and had a melt viscosity of 257 [Pa*s], determined by means of an SR 200 viscometer as described above, and it was readily processable by sidestream technology with no rise in pressure in the concentrate line for the purpose of coloring a polyester melt prior to spinning.

Example 4

A powder mixture consisting of 30% by weight of C.I. Pigment Green 7, 63% by weight of polybutylene terephthalate, and, inventively, 7% by weight of the copolyester of example 2 (23% by weight of copolyester, based on the amount of pigment employed) was mixed in a compounder without addition of dispersants and was melted, dispersed, and homogenized. Following discharge from the compounder the polyester colorant concentrate was reduced to pellets. The polybutylene terephthalate/pigment concentrate thus produced had a specific solution viscosity of 927, determined for a polymer concentration of 1 g/100 ml in dichloroacetic acid at 25° C. (298 K), and a melt viscosity of 224 [Pa*s], determined by means of an SR 200 viscometer as described above.

The concentrate of the invention was able to be processed for the purpose of coloring staple polyester fiber and polyester filament by means of sidestream technology with no pressure increase in the feed lines.

The invention claimed is:
1. A polyester colorant concentrate comprising
(a) a polyester carrier material,
(b) at least one colorant selected from the group consisting of dyes pigments or a combination thereof,
(c) 0.1 to 2 parts by weight per part by weight of a copolyester comprising the reaction product of
  (A) at least one aliphatic primary dihydric alcohol having 2 to 6 carbon atoms and
(B) a mixture (100 mol %) of 25 to 65 mol % terephthalic acid, 25 to 65 mol % isophthalic acid, and 5 to 20 mol % phthalic acid, or
(B) a mixture (100 mol %) of 40 to 55 mol % terephthaiic acid, 25 to 50 mol % isophthalic acid, and 7 to 23 mol % sebacic acid
  wherein the copolyester has
  (i) a melting range between 120 and 160° C.;
  (ii) a melt viscosity MV of 12 to 126 Pa*s, measured at 190° C. and 2.16 kg in accordance with ISO 1133; and

(iii) a melt viscosity factor MF of −2.3 to −0.3 Pa·s/deg, determined with a temperature increase in the range from 160° C. to 240° C. at a shear rate of $10s^{-1}$.

2. The polyester colorant concentrate as claimed in claim 1, containing 0.5 to 1.5 parts by weight of the copolyester (c) per part by weight of the colorant.

3. The polyester colorant concentrate as claimed in claim 1, wherein the melting range of the copolyester is between 130 and 150° C.

4. The polyester colorant concentrate as claimed in claim 1, wherein the at least one colorant is one or more pigments selected from the group consisting of carbon black pigments, monoazo pigments, disazo pigments, phthalocyanine pigments, anthraquinone pigments, and quinacridone pigments.

5. The polyester colorant concentrate as claimed in claim 1, wherein the amount of colorant (b) is between 5% and 60% by weight, based on the total weight of the polyester colorant concentrate.

6. The polyester colorant concentrate as claimed in claim 1, wherein component (A) is a glycol selected from the group consisting of 1,2-ethanediol, 1,3-propanediol, 1,4-butanediol, 1,6-hexanediol, and neopentyl glycol, and a combination thereof.

7. The polyester colorant concentrate as claimed in claim 1, containing 0.5% to 30% by weight, based on the total weight of the polyester colorant concentrate, of one or more dispersing assistants.

8. A process for producing a polyester colorant concentrate as claimed in claim 1 comprising the steps of mixing components (a), (b), and (c) and, optionally, one or more dispersing dispersing assistants to form a mixture, melting, dispersing, homogenizing, cooling, and pelletizing the mixture.

9. A spin colored polyester fiber and polyester filament comprising the polyester colorant concentrate as claimed in claim 1.

10. The polyester colorant concentrate as claimed in claim 1, wherein component (A) is a glycol selected from the group consisting of 1,2-ethanediol, 1,3-propanediol, 1,4-butanediol, 1,6-hexanediol, and neopentyl glycol, and a combination thereof.

\* \* \* \* \*